United States Patent
Ananthan

(10) Patent No.: US 10,719,545 B2
(45) Date of Patent: Jul. 21, 2020

(54) METHODS AND SYSTEMS FOR FACILITATING STORYTELLING USING VISUAL MEDIA

(71) Applicant: Swarna Ananthan, Secaucus, NJ (US)

(72) Inventor: Swarna Ananthan, Secaucus, NJ (US)

( * ) Notice: Subject to any disclaimer, the term of this patent is extended or adjusted under 35 U.S.C. 154(b) by 0 days.

(21) Appl. No.: 16/138,085

(22) Filed: Sep. 21, 2018

(65) Prior Publication Data

US 2019/0095392 A1 Mar. 28, 2019

Related U.S. Application Data

(60) Provisional application No. 62/561,999, filed on Sep. 22, 2017.

(51) Int. Cl.
| | | |
|---|---|---|
| G06F 17/00 | (2019.01) | |
| G06F 16/438 | (2019.01) | |
| H04N 21/43 | (2011.01) | |
| G06F 16/483 | (2019.01) | |
| H04N 21/8545 | (2011.01) | |
| H04N 21/81 | (2011.01) | |

(52) U.S. Cl.
CPC ........ *G06F 16/4393* (2019.01); *G06F 16/483* (2019.01); *H04N 21/4307* (2013.01); *H04N 21/8153* (2013.01); *H04N 21/8545* (2013.01)

(58) Field of Classification Search
CPC .... G06F 16/4393; G06F 16/483; G06F 16/48; H04N 21/8545; H04N 21/4307; H04N 21/8153
See application file for complete search history.

(56) References Cited

U.S. PATENT DOCUMENTS

| | | | | |
|---|---|---|---|---|
| 7,246,315 B1 * | 7/2007 | Andrieu | ................ | G06Q 90/00 715/706 |
| 7,818,329 B2 * | 10/2010 | Campbell | ............... | G06F 16/48 707/755 |
| 7,831,111 B2 * | 11/2010 | Shah | ....................... | G06F 16/58 382/305 |
| 8,566,348 B2 * | 10/2013 | Rinearson | .............. | G06Q 30/02 707/769 |

(Continued)

FOREIGN PATENT DOCUMENTS

GB  2519312  4/2015

OTHER PUBLICATIONS

Pavlik, John V., et al, "The Emergence of Augmented Reality (AR) as a Storytelling Medium in Journalism", Jan. 13, 2013, https://doi.org/10.1177/1522637912470819, vol. 15, Issue 1, Journalism and Communication Monographs, pp. 4-59. (Year: 2013).*

(Continued)

*Primary Examiner* — Laurie A Ries

(57) ABSTRACT

The disclosure includes a method of facilitating storytelling using visual media. In some embodiments, the method includes receiving, via a storyteller device associated with a storyteller, an input. The method may also include identifying, via a processing device communicatively coupled to the storyteller device, visual media based on the input. As well, some embodiments include the step of presenting, via at least one of the storyteller device and a listener device communicatively coupled to the processing device, the visual media. The listener device may be associated with a listener.

14 Claims, 9 Drawing Sheets

(56) References Cited

U.S. PATENT DOCUMENTS

| | | | | |
|---|---|---|---|---|
| 8,694,494 | B2* | 4/2014 | Hanechak | G06F 16/58 707/723 |
| 8,923,551 | B1* | 12/2014 | Grosz | G06F 16/583 382/100 |
| 8,934,717 | B2* | 1/2015 | Newell | G11B 27/034 382/190 |
| 9,665,563 | B2* | 5/2017 | Min | G06F 17/214 |
| 9,838,867 | B2* | 12/2017 | Haseltine | H04L 9/0827 |
| 2001/0049596 | A1* | 12/2001 | Lavine | G06F 17/2785 704/9 |
| 2002/0059045 | A1* | 5/2002 | Tackett | G06F 17/279 702/182 |
| 2005/0064374 | A1* | 3/2005 | Spector | G09B 17/006 434/169 |
| 2006/0288006 | A1* | 12/2006 | Eschbach | G06F 16/58 |
| 2007/0147654 | A1* | 6/2007 | Clatworthy | G06F 17/2735 382/100 |
| 2008/0005656 | A1* | 1/2008 | Pang | G09B 5/062 715/203 |
| 2009/0254836 | A1* | 10/2009 | Bajrach | G11B 27/031 715/745 |
| 2010/0138749 | A1* | 6/2010 | Covannon | G06F 17/24 715/733 |
| 2010/0169792 | A1* | 7/2010 | Ascar | G06F 11/3414 715/744 |
| 2010/0241962 | A1* | 9/2010 | Peterson | G06F 3/0481 715/720 |
| 2011/0029914 | A1* | 2/2011 | Whitby | G06T 11/60 715/781 |
| 2011/0054985 | A1* | 3/2011 | Ricci | G06Q 10/00 705/7.41 |
| 2011/0060990 | A1 | 3/2011 | Gross | |
| 2011/0078564 | A1* | 3/2011 | Almodovar | G06F 17/271 715/262 |
| 2011/0282867 | A1* | 11/2011 | Palermiti, II | G06F 16/5866 707/722 |
| 2012/0054796 | A1* | 3/2012 | Gagnon | H04N 5/602 725/40 |
| 2013/0047181 | A1* | 2/2013 | Recco | H04N 21/4722 725/32 |
| 2013/0093774 | A1* | 4/2013 | Sridhar | G06T 13/80 345/473 |
| 2013/0249948 | A1* | 9/2013 | Reitan | G06F 3/011 345/633 |
| 2014/0136186 | A1* | 5/2014 | Adami | G06F 17/2264 704/9 |
| 2014/0172856 | A1* | 6/2014 | Imbruce | G06F 16/35 707/737 |
| 2014/0191976 | A1* | 7/2014 | Peevers | G10L 21/10 345/173 |
| 2014/0282013 | A1* | 9/2014 | Amijee | G06F 16/4393 715/732 |
| 2014/0324717 | A1* | 10/2014 | Ayers | G06Q 50/01 705/319 |
| 2014/0357731 | A1* | 12/2014 | Needleman | A61K 9/0014 514/785 |
| 2015/0007005 | A1* | 1/2015 | Edge | G06F 17/24 715/205 |
| 2015/0370888 | A1* | 12/2015 | Fonseca | G06F 16/4393 707/738 |
| 2016/0110899 | A1* | 4/2016 | Kalb | G06F 17/24 715/202 |
| 2016/0225187 | A1* | 8/2016 | Knipp | G06T 19/006 |
| 2017/0017696 | A1* | 1/2017 | Alonso | G06F 40/169 |
| 2017/0078621 | A1* | 3/2017 | Sahay | G06F 16/51 |
| 2017/0139955 | A1* | 5/2017 | Dutta | G06F 17/271 |
| 2017/0194032 | A1* | 7/2017 | Walworth | G06F 17/248 |
| 2020/0007944 | A1* | 1/2020 | Han | H04N 21/25841 |

OTHER PUBLICATIONS

Al-Mousawi, Zahra, et al, "A Digital Storytelling Tool for Arab Children", IIWAS '12: Proceedings of the 14th International Conference on Information Integration and Web-based Applications and Services, Dec. 2012, pp. 26-35. (Year: 2012).*

* cited by examiner

METHODS AND SYSTEMS FOR FACILITATING STORYTELLING USING VISUAL MEDIA

CROSS-REFERENCE TO RELATED APPLICATIONS

This application claims the benefit of U.S. Provisional Patent Application No. 62/561,999; filed Sep. 22, 2017; and entitled METHOD AND SYSTEM FOR FACILITATING STORYTELLING USING VISUAL MEDIA. The entire contents of Patent Application No. 62/561,999 are incorporated by reference herein.

BACKGROUND OF THE INVENTION

Field of Invention

The present disclosure generally relates to the field of data processing. More specifically, the present disclosure relates to methods and systems for facilitating storytelling using visual media.

Description of Related Art

People communicate and interact with each other daily through various means of communication such as text-messages, video messages, audio messages and stories. Apart from this, communication between people can be generalized into verbal communication and non-verbal communication. Verbal communication is mediated between two or more parties through speech while non-verbal communication involves a person's facial expressions, gestures, eye contact, posture, etc.

Further, storytelling is a form of communication that is known to be highly effective, as it presents information to a listener in an organized and memorable series of events. The concept of storytelling dates back to ancient times. Storytelling allows people to share information with one another for entertainment, and sometimes for instructional purposes.

Recently, storytellers have started realizing the benefits of sharing stories using pictures and/or visual presentations in order to narrate a story. Until now, storytelling has typically been non-interactive and non-responsive in a way that does not allow direct, real time communication between the storyteller and a listener.

Further, while several software tools have been developed to enable storytellers to prepare and share stories online, storytellers are still burdened with the task of creating or finding visual media, and sharing it with their respective listeners in order to narrate a story. Moreover, existing software tools provide very little customization of such visual media according to the needs of a storyteller and/or listeners.

Furthermore, in some scenarios, such as remote presentation, storytellers have limited to no information regarding their listeners. In other words, storytellers remain unaware about their listener's preferences and other details, such as a listener's demography, favorite story genre, favorite story characters, etc.

Moreover, existing media used for storytelling are limited with regard to a listener's ability to explore a character in greater detail. This often presents a problem for listeners who wish to delve deep into a character.

Thus, there is a need for methods and system for facilitating storytelling using visual media that may overcome one or more of the above-mentioned problems and/or limitations.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some embodiments, a method of facilitating storytelling using visual media is provided. The method may be performed, for example, by an online platform that may be in communication with electronic devices (e.g. smartphone, laptop computer, desktop computer, wearable computer, etc.) operated by a storyteller and one or more listeners.

The method may include a step of receiving, using a communication device, an input criterion from a storyteller device operated by the storyteller. The input criterion may generally represent a context for a story. For example, the input criterion may include one or more of a story title, keywords associated with the story, an excerpt of the story, an abstract of the story and/or the entirety of the story. Alternatively, in some instances, the input criterion may include profile information corresponding to one or more of the storyteller and one or more listeners. The profile information may include, for example, topics of interest, demographic data, history of stories presented and/or listened to, etc.

Further, the method may include a step of identifying, using a processing device, visual media based on the input criterion. The visual media may include, for example, images, videos, animation, multimedia and so on. For example, based on a theme of the story, one or more relevant images and videos may be identified by querying a database. Further, the method may include a step of transmitting, using the communication device, the visual media to the storyteller device. Accordingly, the visual media may be presented to the storyteller. Further, the storyteller may be enabled to perform one or more selections associated with the visual media presented. Furthermore, the one or more selections may also identify one or more regions within an image/video where one or more additional media (text, image, video, audio, multimedia etc.) may be embedded. Accordingly, the one or more selections may also indicate the one or more additional media.

Accordingly, the method may include a step of receiving, using the communication device, the one or more selections from the storyteller device. Additionally, the method may include a step of generating, using the processing device, embedded visual media based on the one or more selections. Further, the embedded visual media may be in a format that may facilitate capturing of user interactions with the embedded visual media. The user interactions may include, for example, a touch input, a mouse hovering event, a mouse click event, etc.

Further, the method may include a step of transmitting, using the communication device, the embedded visual media to the storyteller device and the one or more listener devices. Accordingly, the embedded visual media may be rendered at the one or more listener devices. For example, the embedded visual media may be transmitted during narration of the story. Accordingly, an experience of storytelling and listening may be enhanced.

Further, the one or more listeners may interact with the embedded visual media by performing operations such as viewing, zooming, panning, activating presentation of the one or more additional media and so on. In an instance, such operations may be performed via touch actions on a touch sensitive screen displaying the embedded visual media. Alternatively and/or additionally, such operations may be performed via input devices such as a mouse, stylus, keyboard, joystick, haptic interface, voice based interface and so on. Such user interactions may be recorded by the one or more listener devices and transmitted to the online platform. Accordingly, the method may further include a step of receiving, using the communication device, the user interactions from the one or more listener devices. Further, the method may include a step of transmitting, using the communication device, the user interactions to the storyteller device. Accordingly, information regarding the user interactions may be presented to the storyteller. In an instance, the information may be presented in a leaderboard format.

In some embodiments, information pertaining to user interactions may be presented in the form of a heat-map, wherein a temperature, represented by a color, associated with a region of the embedded visual media may be indicative of a number of user interactions from the one or more listeners on the region. For example, the region may correspond to the one or more additional media associated with the embedded visual media. Accordingly, the storyteller may be able to view in real-time responses of the one or more listeners to the embedded visual media.

Additionally, the disclosure includes a method of facilitating storytelling using visual media. In some embodiments, the method includes receiving, via a storyteller device associated with a storyteller, an input; identifying, via a processing device communicatively coupled to the storyteller device, visual media based on the input; and presenting, via at least one of the storyteller device and a listener device communicatively coupled to the processing device, the visual media, wherein the listener device is associated with a listener. The visual media may include at least one of an image, a video, an animation, voice, contextual music, and multimedia.

In some embodiments, the input includes at least one of a story title, keywords associated with a story, an excerpt of the story, an abstract of the story, and an entirety of the story. Additionally, the input may comprise profile information about at least one of the storyteller and the listener. Even still, the profile information may comprise at least one of topics of interest, demographic data, a history of stories presented, and a history of stories listened to.

Methods may include identifying, via the storyteller device, at least one region within the visual media to present embedded visual media. The embedded visual media may comprise at least one of a text, an image, a video, audio data, an interactive animation, and multimedia data. Accordingly, in some embodiments, the method includes presenting, via the listener device, the embedded visual media.

Methods may also include generating, via the processing device, embedded visual media based on one or more selections. The embedded visual media may define a format that facilitates capturing of one or more listener interactions with the embedded visual media. The one or more listener interactions may comprise at least one of a touch input, a mouse hovering event, a mouse click event, viewing, zooming, panning, and activating a presentation of the embedded visual media. Additionally, the one or more listener interactions may be performed using at least one of a mouse, stylus, keyboard, joystick, haptic interface, and voice based interface.

In some embodiments, the method includes recording, via the listener device, the one or more listener interactions. Methods may also include presenting, via the storyteller device, an indication of the one or more listener interactions. The one or more listener interactions may be presented via the storyteller device in a leaderboard format.

Methods may also include presenting in real-time, via the storyteller device, responses of the one or more listener interactions to the embedded visual media. Additionally, methods may include presenting, via at least one of the storyteller device and the listener device, the embedded visual media. The embedded visual media may be simultaneously presented during narration of the story.

In some embodiments, the storyteller device comprises at least one of a first smart phone, a first tablet, and a first computer, and the listener device comprises at least one of a second smart phone, a second tablet, and a second computer. As well, the presenting step may be performed via an online platform that communicatively couples the processing device, the storyteller device, and the listener device together.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description. The embodiments described above include many optional features and aspects. Additionally, features and aspects of the embodiments can be combined. Other objects and advantages of the embodiments herein will become readily apparent from the following detailed description taken in conjunction with the accompanying drawings.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
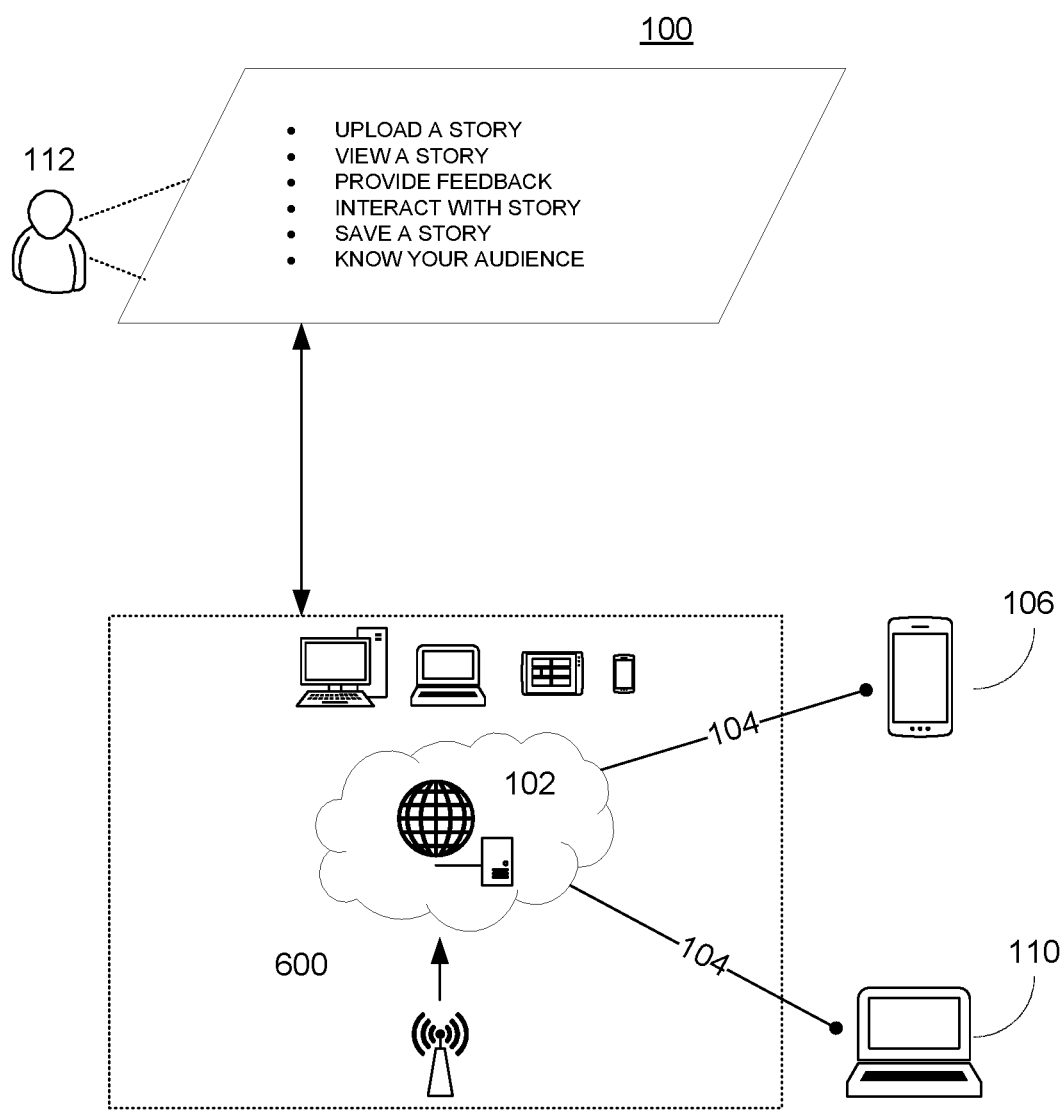
FIG. 1 illustrates a visual media storytelling platform, according to some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of providing a regulatory research toolbar in web based platform, embodiments of the present disclosure are not limited to use only in this context. For example, the disclosed techniques may be used to search for law related documents on the Internet. Similarly, The content for narration is not limited to only stories and would extend to education, entertainment and the like.

System Embodiments

FIG. 1 illustrates a platform consistent with various embodiments of the present disclosure. By way of non-limiting example, an online platform 100 (also referred to herein as a visual based interactive storytelling platform) for facilitating storytelling using visual media may be hosted on a centralized server 102, such as a cloud computing service. The centralized server 102 may be communicatively coupled to at least one of a mobile device 106, other electronic device 110, and any device arranged and configured to communicate via a wireless connection, by means of a communication network 104, such as an Internet. The mobile device 106 may include at least one of a smartphone, a laptop, a tablet computer, and the like. The other electronic device 110 may include at least one of a desktop computer, server computer, and the like.

In some embodiments, a user 112 of the platform may include at least one of a storyteller, listener, researcher, teacher, instructional designer, and the like. The user 112 of the platform may define any party relevant to the storytelling and listening experience. Accordingly, at least one of the mobile device 106 and the electronic device 110 may be operated by the one or more users 112, and may be in communication with the platform 100. For example, the mobile device 106 may be operated by a technician who is listening to a story uploaded by an instructional designer on the online platform 100.

The user 112 may access platform 100 through at least one of a web based software application and a web browser. The web based software application may include at least one of a website, a web application, a desktop application, a mobile application compatible with a computing device 600, and the like.

In an exemplary scenario, a storyteller may access the online platform 100 via a storyteller device (e.g., a smartphone, a tablet computer, a laptop/desktop computer) in order to deliver a story to at least one listener. Accordingly, at least one listener device (e.g., a smartphone, a tablet computer, a laptop/desktop computer) may be in communication with the online platform 100. Further, each of the storyteller and the at least one more listener may be registered on the online platform as users. Accordingly, user accounts, such as a storyteller account and one or more listeners' accounts, may be created on the online platform. The accounts may include profile information of associated users such as topics of interest, demographic data, history of stories presented and/or listened to, etc.

Further, upon accessing the online platform 100, the storyteller may be presented with at least one visual media. The storyteller may select at least one visual media in order to support a storytelling session. For example, if the storyteller intends to tell a story called, "The Secret Garden", an input criterion may be provided in the form of keywords, such as a garden, kids, and swings. Accordingly, the online platform may access a database of visual media to identify at least one visual media that may be relevant to the storyteller and/or the one or more listeners. In an instance, the storyteller may specify at least one of a title of the story and a keyword describing a theme of the story. Accordingly, the online platform 100 may identify the at least one visual media based on the at least one of the title and the keyword, and present the visual media to the storyteller. In some embodiments, the at least one visual media may be in the form of digital images. Accordingly, the at least one visual media presented by the online platform may be conceptually related to the story that the storyteller wishes to share with the one or more listeners.

Subsequently, the storyteller may perform one or more selection to indicate one or more visual media that may be used during a storytelling session. Additionally, the one or more selection may also identify one or more region within a visual media where one or more additional media (e.g., text, image, video, audio, multimedia) may be embedded. Accordingly, the one or more selections may also indicate the one or more additional media. Based on the one or more selection, the online platform 100 may generate an embedded visual media. Further, the embedded visual media may be in a format that may facilitate capturing a user interaction with the embedded visual media. The user interactions may include a touch input, a mouse hovering event, a mouse click event, and the like.

In some embodiments, the online platform 100 may transmit the embedded visual media to the storyteller device and the one or more listeners' device. Accordingly, the embedded visual media may be rendered at the one or more listeners' device. Further, a timing associated with presentation of the embedded visual media may be controlled by the storyteller. Furthermore, in some embodiments, one or more timings associated with presentation of the one or more additional media may also be controlled by the storyteller. Accordingly, the storyteller may orchestrate presentation of the one or more additional media and/or the embedded visual media with greater flexibility.

Subsequently, the one or more listeners may interact with the embedded visual media by performing operations such as viewing, zooming, panning, activating presentation of the one or more additional media, and the like. According to some embodiments, the one or more listeners may also use pre-defined touch and hand gestures to interact with the embedded visual media. Such user interactions may be recorded by the one or more listeners' device and transmitted to the online platform. Further, the user interactions may be transmitted to the storyteller device.

Accordingly, information regarding the user interactions may be presented to the storyteller. In an instance, the information may be presented in a leaderboard format. As well, the information may be presented in the form of a heat-map, wherein a temperature, represented by a color, may be associated with a region of the embedded visual media may be indicative of a number of user interactions from the one or more listeners within the region. For example, the region may correspond to the one or more additional media associated with the embedded visual media. Accordingly, the storyteller may be able to view responses of the one or more listeners to the embedded visual media in real-time or near real-time. It should be appreciated that the term "near" may be defined as a short amount of time, or an insignificant amount of time, such as less than 5 seconds.

Furthermore, the storyteller may also be presented with contextual information pertaining to a listener. Such contextual information may include the listener's demography, favorite stories, favorite characters, favorite story genres based upon a listener's previously listened stories, and the like. In some embodiments, the contextual information may also depict feedback shared by the one or more listeners.

Figure 2:
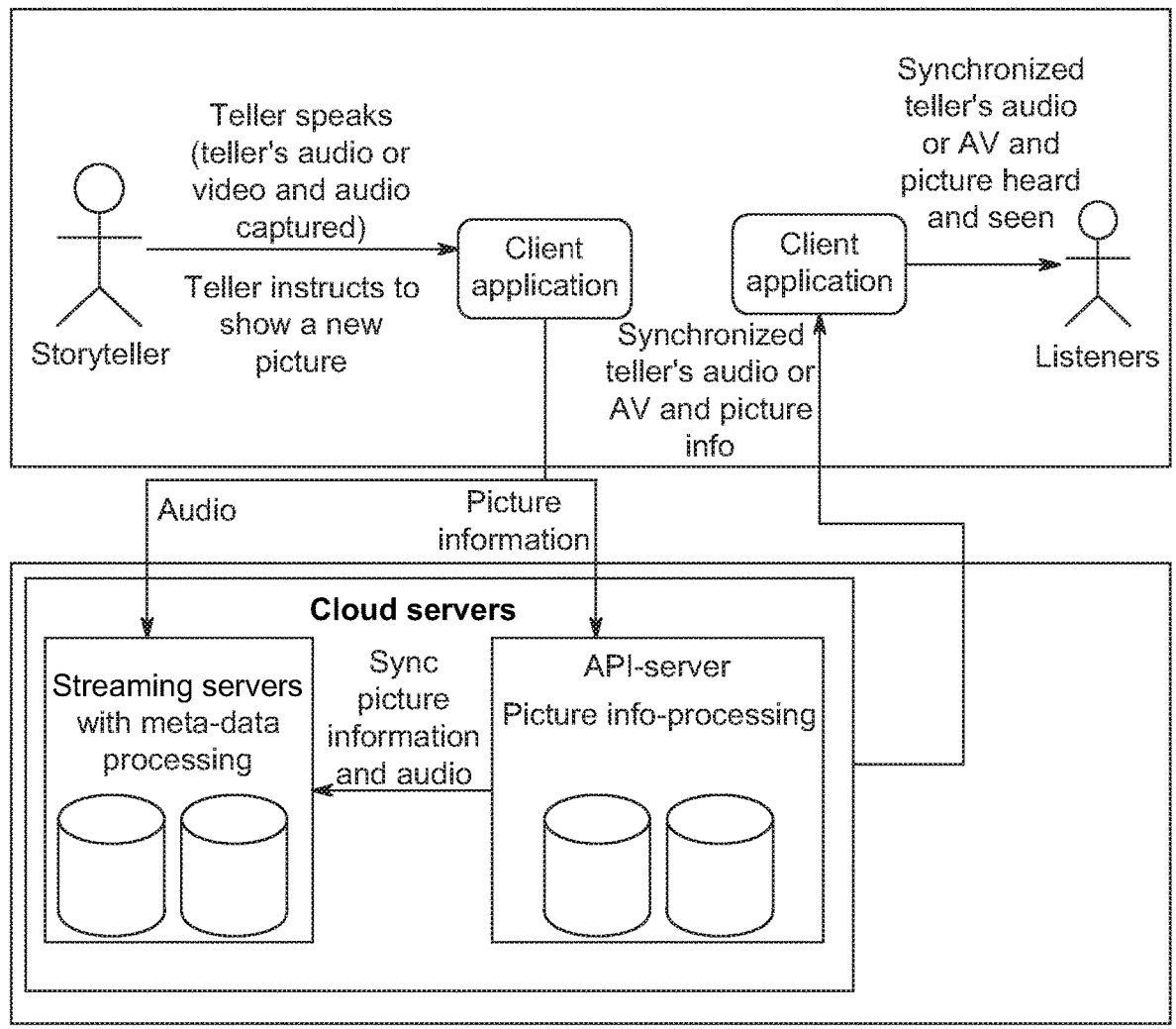
FIG. 2 illustrates a flowchart of a method for facilitating storytelling using visual media including presentation of visual media along with an audio story, according to some embodiments.

FIG. 2 illustrates a flowchart of a method of facilitating storytelling using visual media, including presentation of visual media with an audio story, in accordance with some embodiments.

First, the online platform 100 may receive, from the mobile device 106 operated by a storyteller, an input criterion. The input criterion, also called "input", may include at least one of a textual story, a theme of a story, a keyword associated with a story, and the like. In some embodiments, the storyteller may access the online platform through the mobile device using at least one of a mobile app and a web application.

In some embodiments, the online platform 100 may facilitate automatic conversion of textual story uploaded by a storyteller into a visual story. The online platform 100 may use at least one keyword associated with the textual story to convert the textual story into a visual story. For example, if the keywords related to the textual story "Cinderella" are fairy godmother and a magic wand, the visual media may be presented accordingly. In this case, the visual media may include the digital image showing a fairy having a magic wand in her hand. According to further aspects, the method may include NLP processing for assisting the online platform in conversion of textual story into the visual story. Further, the online platform may present the visual story to the storyteller before further processing. In some embodiments, the visual story provided by the online platform may include visual media that is editable. Accordingly, the storyteller may edit the visual media provided by the online platform.

In some aspects, the visual based storytelling platform may allow a storyteller to manually make a visual story. In some embodiments, the online platform may include a repository of visual story templates that may be edited to be later shared with the listener's mobile device.

In some embodiments, the online platform may also present, on a storyteller's mobile device, a choice to select embeddable content related to the visual story, such as, but not limited to, an audio track, a video, and an animation. For example, if the storyteller wants to share a story called, "The Jungle Book", the audio track associated with "The Jungle Book" may include sounds of a lion, a bear and a snake. In some aspects, the embedded visual media may respond to a listener's interaction, such as a touch input. In an instance, the embeddable visual media may start an animation when the listener's interaction is received.

According to further aspects, the visual media may be rendered using a JSON based format. In some aspects, the JSON based format may include background image information such as a URL and an image size. In some embodiments, the visual media needing animation may first be declared as an array of image information. Further, the image information may contain URL of an animatable image, image size, and vertical and horizontal distances from the background image. The image information array may also include animation information for an image. Further, the animation information may include an object attribute and an action attribute. The "object" attribute indicates index of an object to animate from the image information array. The "action" attribute can have either of two values, i.e. touch and none. Accordingly, if the action is touch, then animation object may start or stop touch events, and, if the action is none, the animation object may start animation automatically and may not wait for a touch event.

According to some embodiments, the online platform may include cloud-based servers configured to synchronize story elements, such as the visual media and the audio track. The cloud-based servers may include an API server and one or more streaming servers. The API server may be responsible for processing information related to the visual media such as, but not limited to, width, height, vertical offset, horizontal offset, and the like. The one or more streaming servers may include a metadata processing feature. Thereafter, the API server and the one or more streaming servers may work in conjunction to synchronize information captured in the visual media and the audio track associated with the visual story.

Further, the method may include sharing a synchronized visual story with the one or more listeners on the one or more listeners' device. Accordingly, in some embodiments, a synchronized visual story may be uploaded on the server. Thereafter, the synchronized visual story may be fetched by the one or more listeners' device. Thereafter, the one or more listeners may view or download the visual story using the web application (i.e., a client application) installed on the one or more listeners' device.

According to some aspects, the online platform may provide both live and on-demand stories. In an instance, the one or more listeners may raise a request related to a story, wherein the online platform may receive the request. In response, the online platform may search for an appropriate story related to the request. Further, the online platform may present the story under an on-demand stories tab. In an instance, all telecasted live stories may be made available as on-demand.

According to further aspects, in a case of a live story session, the visual media and the embedded visual media may be available before the live story session begins. Further, the audio associated with the embedded visual media may be streamed during the live story session. In an instance, the online platform may provide the storyteller with an option to select the visual media prior to displaying it to the one or more listeners.

According to further aspects, the online platform may allow a storyteller to control a pace of the story, as well as decide when to change/show a particular visual media to the one or more listeners.

Figure 3:
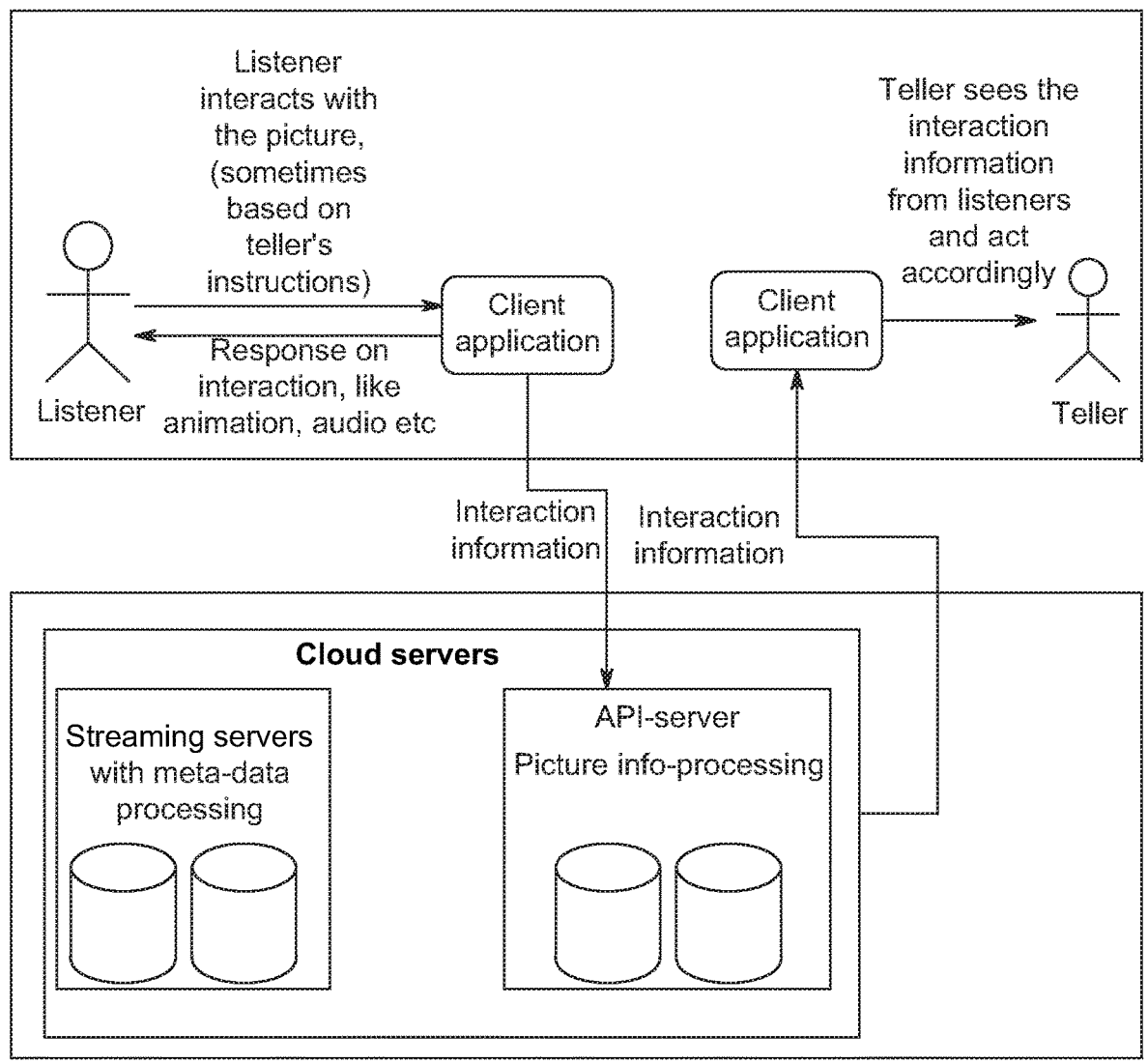
FIG. 3 illustrates a flowchart of a method of facilitating storytelling using visual media including capturing and receiving user interaction information from one or more listeners, according to some embodiments.

FIG. 3 illustrates a flowchart of a method of facilitating storytelling using visual media including capturing and receiving user interaction information from one or more listeners, in accordance with some embodiments.

First, the method may include receiving interaction information from the one or more listeners. In an instance, the one or more listeners may interact with the embedded visual media. Accordingly, the embedded visual media may have interaction points that trigger animation. Further, the one or more listeners may touch any interaction point on the embedded visual media. According to some embodiments, the one or more listeners may also use pre-defined touch/hand gestures to interact with the story.

Further, the method may include providing an automated response associated with the interaction information. In some embodiments, the online platform may show an animation as a response to the one or more listeners' interaction with the visual media. For example, if the one or more listeners are viewing a story called "The Princess and the Goblin", the one or more listeners may touch the avatar of princess, upon which an animation may be shown to the one or more listeners on the one or more listeners' device.

Further, in some embodiments, the one or more listeners' device may display information related to a particular character of the story that the one or more listeners have touched. For example, if the one or more listeners, while viewing the story called "The Jungle Book", touches and/or clicks a fictional character of Mowgli, then information related to the fictional character of Mowgli may appear on the screen, such as, but not limited to, Mowgli's goal, likes, dislikes, personality and appearance.

In some embodiments, the interaction information may be sent to the API server for further processing. Thereafter, the interaction information is passed on to the web application (or client application) installed on the mobile device of a storyteller. In an instance, the storyteller may receive a notification on the storyteller's mobile device.

Further, the storyteller may be able to view the interaction information and then act and/or respond accordingly. In some embodiments, the storyteller may respond by sharing another picture associated with the story based upon the interaction information. For example, the online platform may be used by a teacher who is teaching "Applications of Bernoulli's Theorem". Further, the visual based interactive story telling platform may share the visual media (or a digital image) of an airplane during takeoff to explain an application of "Bernoulli's Theorem". Further, the one or more listeners, who is a class 11 student, may interact with the picture by touching and/or clicking on a wing of the airplane. Thereafter, the interaction information (here touching the wing of the plane) may be shared with the teacher.

Further, the teacher may share another picture showing further details of an airplane wing.

Figure 4:
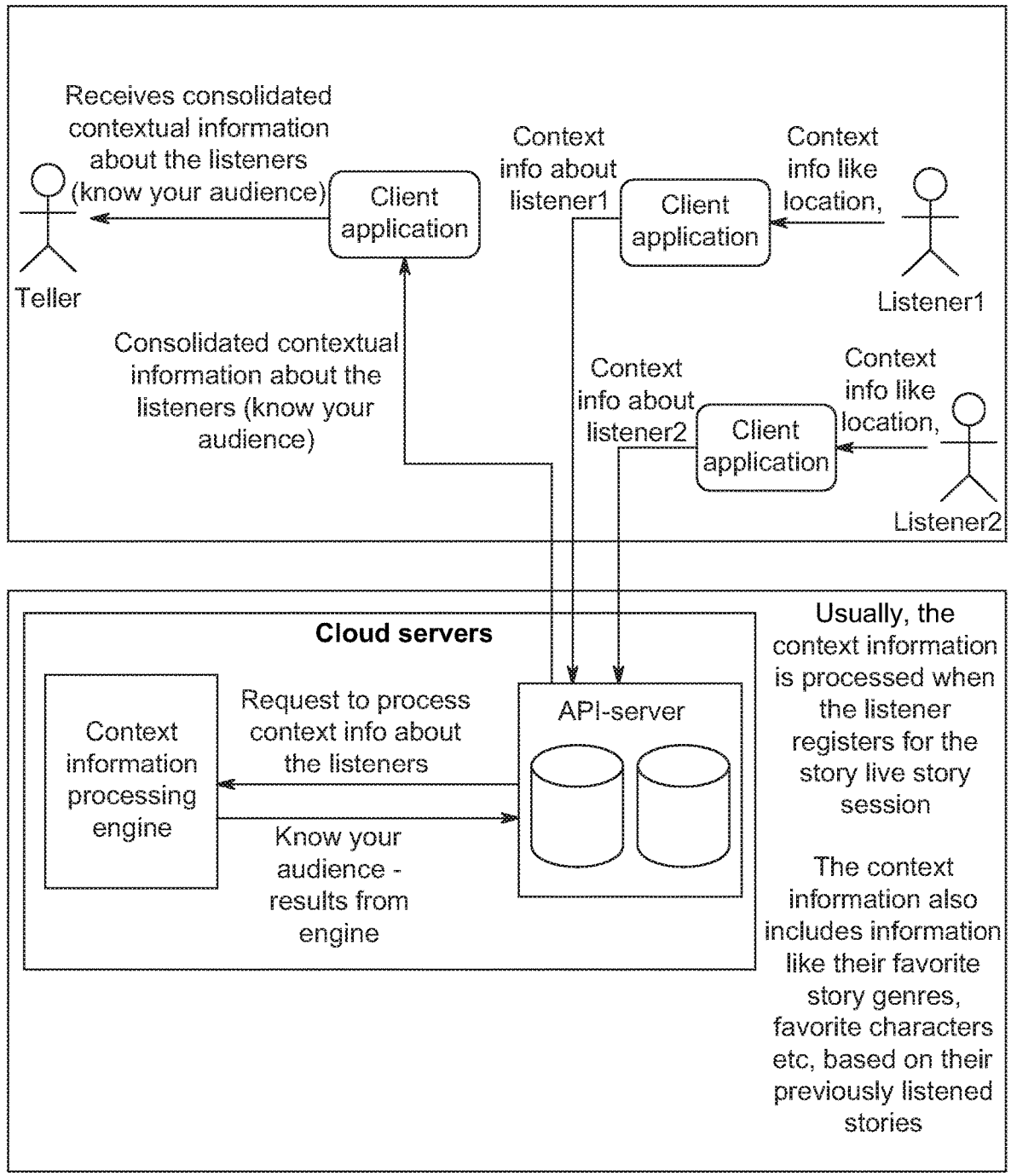
FIG. 4 illustrates a flowchart of a method of facilitating storytelling using visual media including receiving contextual information related to one or more listeners and presenting the contextual information to the storyteller, according to some embodiments.

FIG. 4 illustrates a flowchart of a method of facilitating storytelling using visual media, including receiving contextual information related to one or more listeners and presenting the contextual information to the storyteller, in accordance with some embodiments.

Accordingly, the method may include receiving the contextual information on a posted story, such as, but not limited to, the one or more listener's location, favorite stories, favorite characters, and favorite story genres based upon the one or more listener's previously listened stories. In some embodiments, the contextual information may also depict feedback shared by the one or more listeners. In some embodiments, the feedback may be given using buttons corresponding to actions such as like, dislike, comment, ask, report, and the like. According to some embodiments, the system may also receive feedback and/or the contextual information from the one or more listeners in form of pre-defined touch/hand gestures. For example, the one or more listeners may use a thumbs-up hand gesture to like the story.

According to some aspects, the method may include processing the contextual information received from the one or more listeners. Accordingly, the contextual information may be processed by the cloud based servers, such as the API server and a contextual information processing engine. First, the API server may receive the contextual information from the one or more listeners, such as, but not limited to, the one or more listener's location, favorite stories, favorite characters, and favorite story genres based upon the one or more listener's previously listened stories. Further, the API server may store the contextual information in the database and then send the contextual information to the contextual information processing engine for further processing. Thereafter, the contextual information processing engine may process the contextual information and share results with the API server. For example, the contextual information processing engine may process the one or more listener's location and send it in the form of a Google map address. Further, the API server may perform post processing of the results and then send across the results to the web application installed in the mobile device of a storyteller. In some embodiments, the storyteller may access the results after clicking "Know Your Audience". The "Know Your Audience" feature may allow the storyteller to receive contextual information (e.g., location) related to the one or more listeners. In an instance, the one or more listeners of the story may be termed as an audience. The contextual information may include information such as, but not limited to, the one or more listener's favorite story genres and favorite characters based on their previously listened stories.

According to some aspects, the "Know Your Audience" feature may be available only in a case of a live story session. Usually, the contextual information is processed only when the one or more listeners registers for a live story session. In some embodiments, the live story session may only be available when both the storyteller and the one or more listeners are active on the online platform. In some embodiments, the one or more listeners may also manually invite the storyteller for a live story session, subsequent to which the storyteller may receive a notification on her mobile device.

Figure 5:
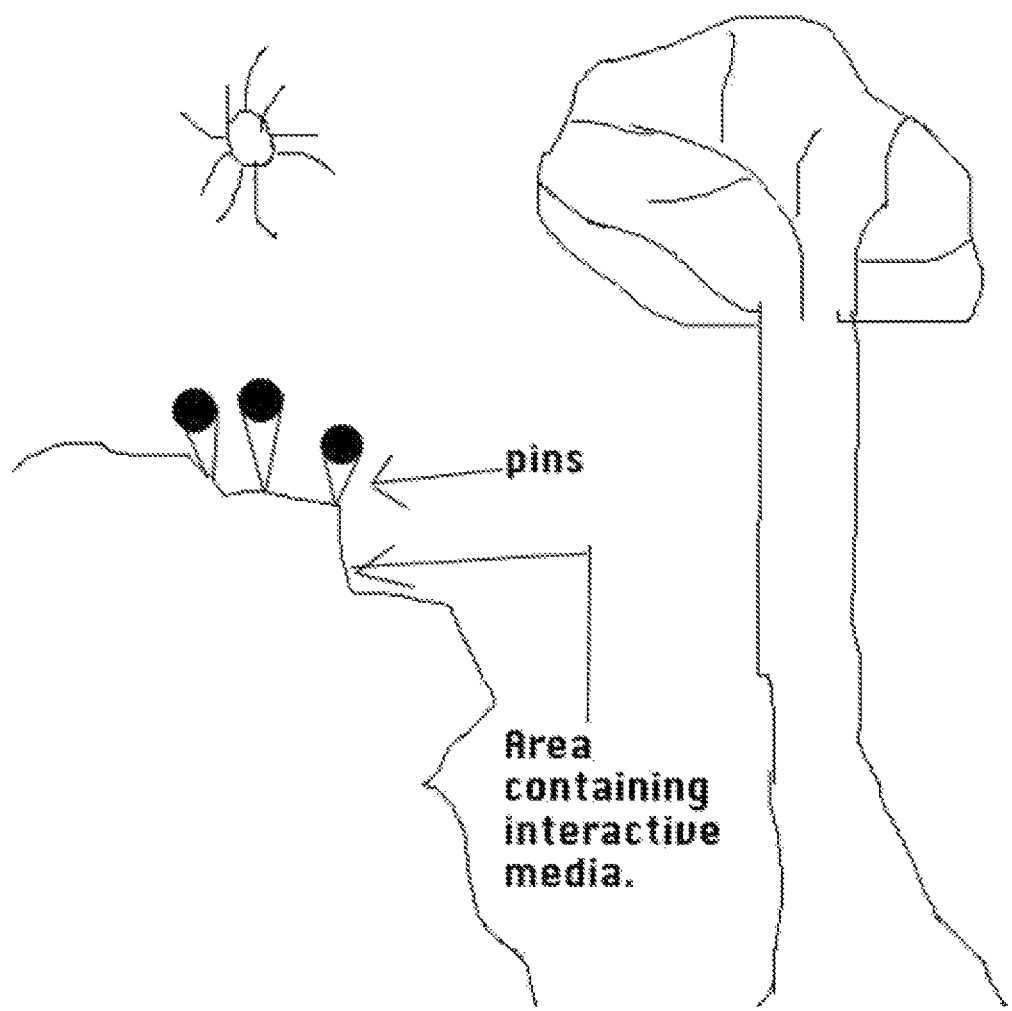
FIG. 5 illustrates an exemplary visual media, including representation of user interaction based on user pins, according some embodiments.

FIG. 5 illustrates an exemplary visual media including representation of user interaction based on user pins, in accordance with some embodiments.

In some embodiments, the online platform may provide graphical representation of user interaction based on user pins. Accordingly, whenever a listener performs a user interaction with a region of the embedded visual media, a user pin associated with the listener may be added to the region. In an instance, the user pin may include a picture of the listener who has interacted with the embedded visual media. Further, whenever a new user interaction is observed, a new user pin may be added to the region where the user interaction was recorded. Similarly, the new user pin may also depict the picture of the listener who has interacted with the embedded visual media. Further, the story teller may also be able to see the user pins, which represent the users who interacted with the region.

According to some aspects, the user pin may include a shaded circular portion. Further, the shaded circular portion of the user pin may include the picture of one or more listeners. For example, the shaded portion of each user pin may include a picture of the corresponding listener who interacted with the region. Likewise, multiple user pins with different pictures in corresponding shaded circular portion may be displayed on the region, in a case wherein multiple listeners interacted with the region.

Furthermore, when the number of listeners becomes very large, the region involving the user interaction may have a single pin instead of multiple user pins (in a case wherein multiple users interact with the embedded visual media). Accordingly, the shaded portion of the user pin may display a count, such that the count may refer to the number of listeners who have interacted with the embedded visual media. Further, once the shaded portion of the user pin is selected by the storyteller and/or the one or more listeners, the online platform may show a list of all listeners.

Figure 6:
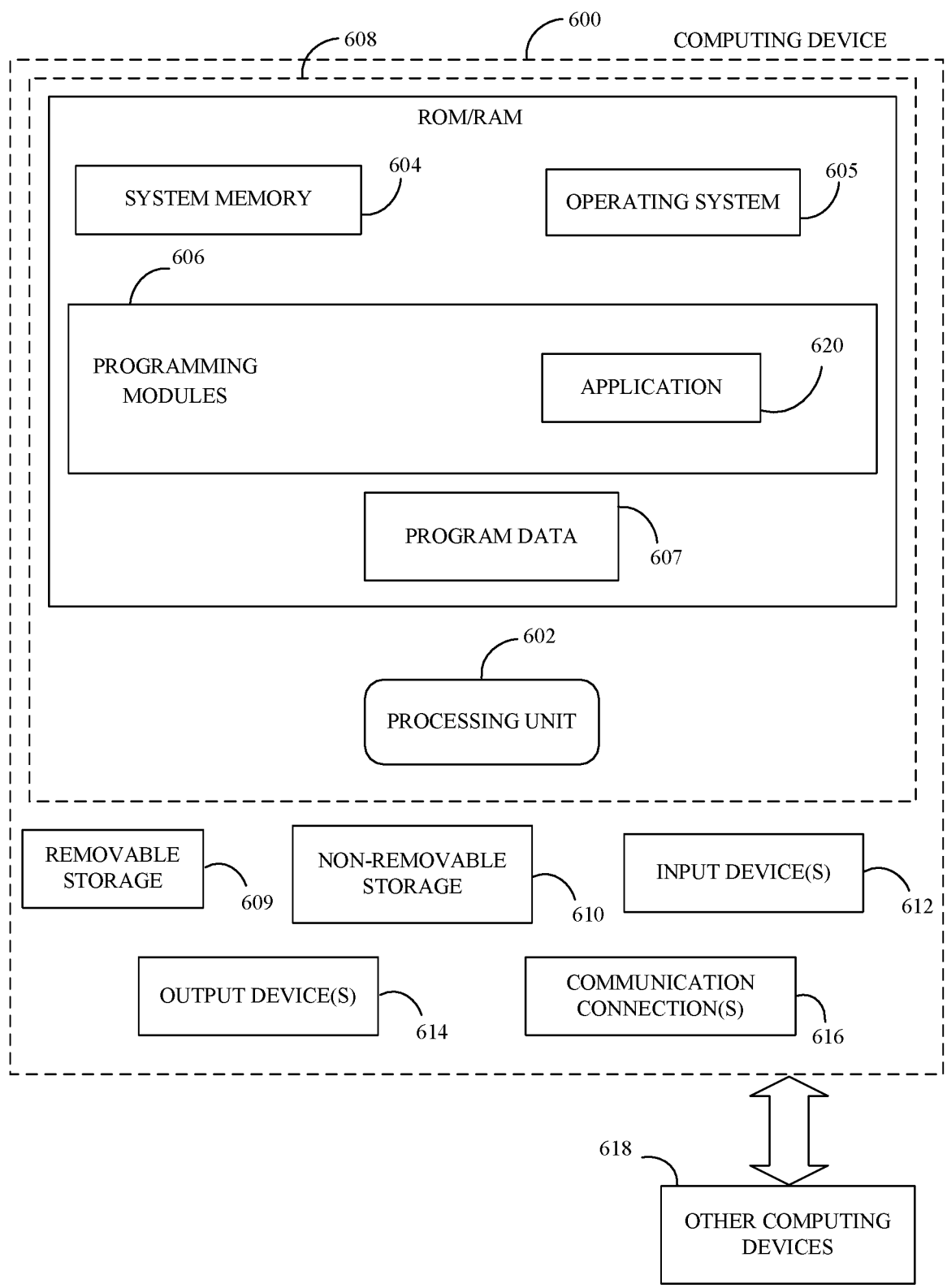
FIG. 6 illustrates a block diagram of a computing device for implementing the methods disclosed herein, according to some embodiments.

FIG. 6 illustrates a block diagram of a system including computing device 600. Consistent with an embodiment of the disclosure, the aforementioned storage device and processing device may be implemented in a computing device, such as computing device 600 of FIG. 6. Any suitable combination of hardware, software, or firmware may be used to implement the memory storage and processing unit. For example, the storage device and the processing device may be implemented with computing device 600 or any of other computing devices 618, in combination with computing device 600. The aforementioned system, device, and processors are examples, and other systems, devices, and processors may comprise the aforementioned storage device and processing device, consistent with embodiments of the disclosure.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, and any combination thereof. System memory 604 may include operating system 605, one or more programming modules 606, and may include a program data 607. Operating system 605, for example, may be suitable for controlling computing device 600's operation. In one embodiment, programming modules 606 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, and the like may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and may include any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., application 620 such as a media player) may perform processes including, for example, one or more stages of methods, algorithms, systems, applications, servers, databases as described above. The aforementioned process is an example, and processing unit 602 may perform other processes. Other programming modules that may be used in accordance with embodiments of the present disclosure may include sound encoding/decoding applications, machine learning application, acoustic classifiers, etc.

Method Embodiments

Figure 7:
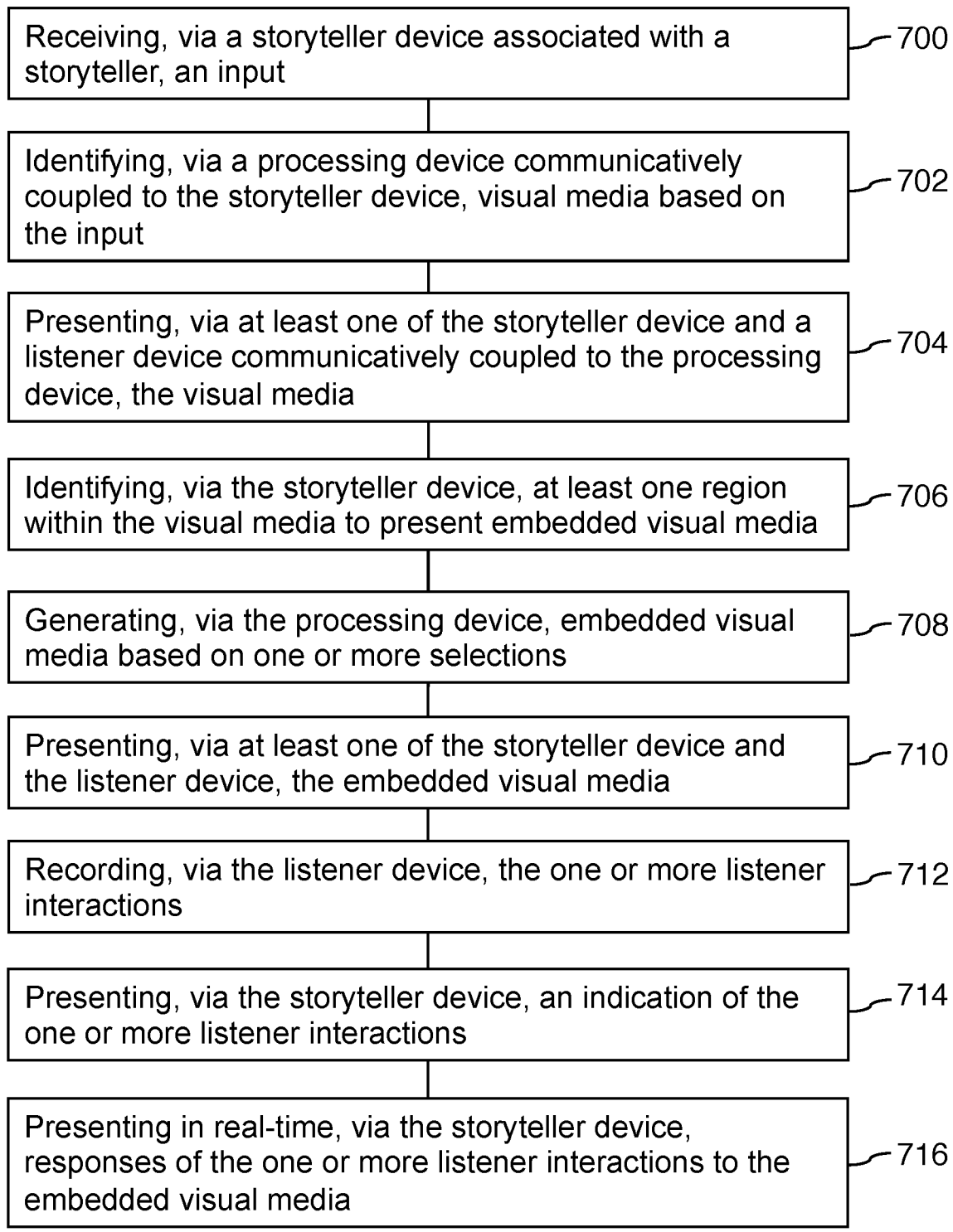
FIG. 7 illustrates a flow chart of methods for using a visual media storytelling platform, according to some embodiments.
Figure 8:
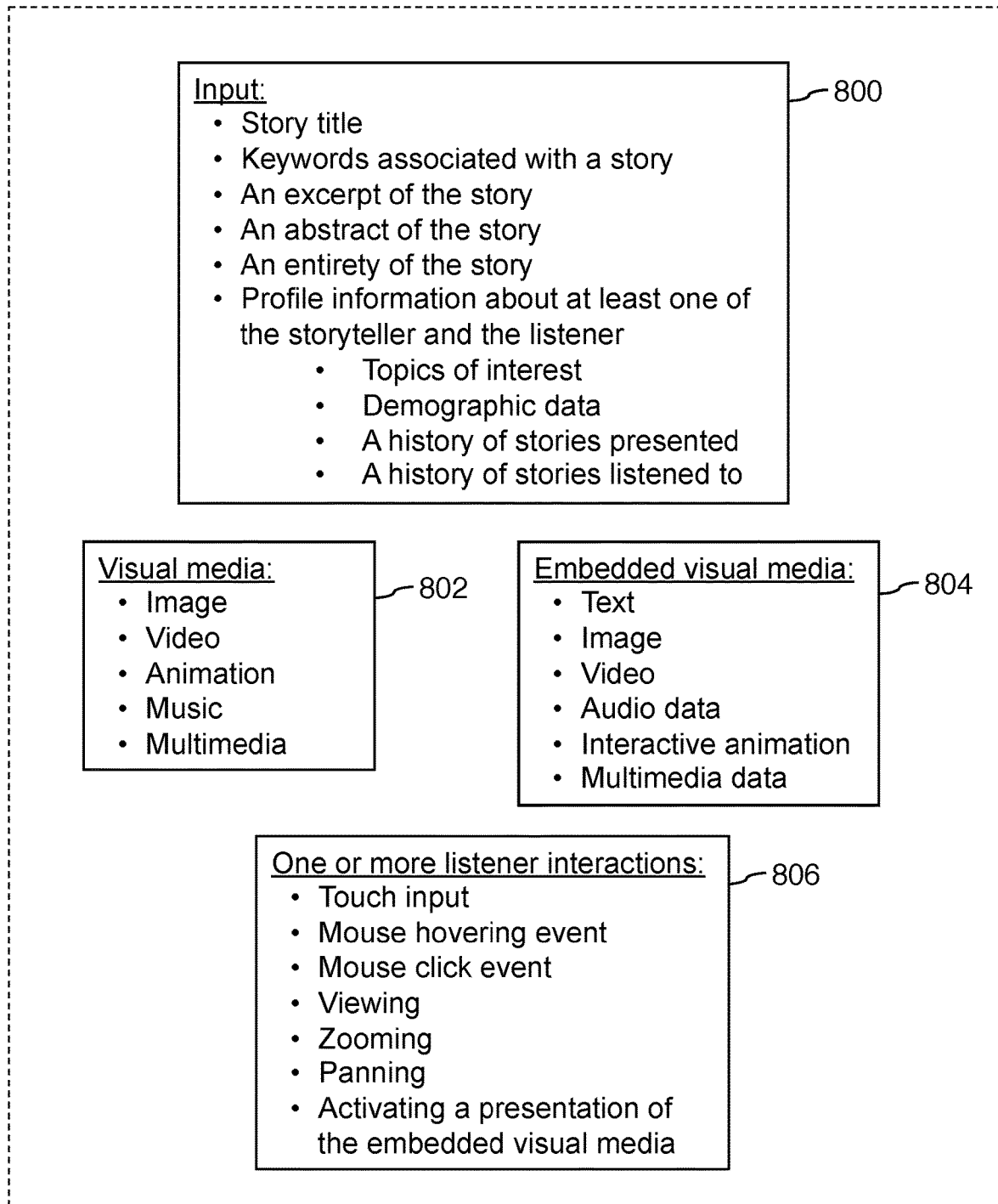
FIG. 8 illustrates a block diagram of various components of methods for using a visual media storytelling platform, according to some embodiments.
Figure 9:
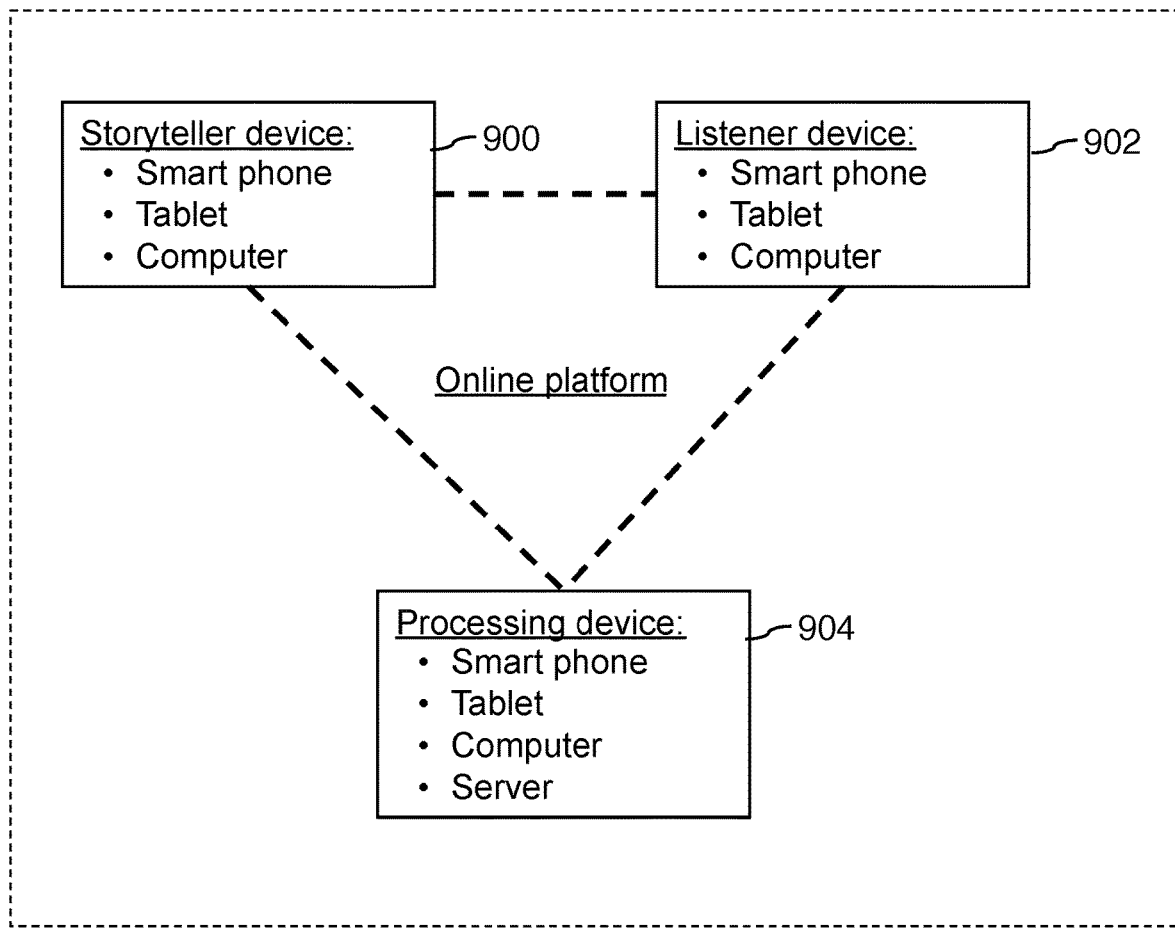
FIG. 9 illustrates a block diagram of various devices for using a visual media storytelling platform, according to some embodiments.

The disclosure also includes methods of facilitating storytelling using visual media. As illustrated in FIGS. 7-9, methods may include receiving, via a storyteller device 900 associated with a storyteller, an input 800 (at step 700). The input 800 may include any portion of a story, such as a story title, at least one keyword associated with a story, an excerpt of the story, an abstract of the story, and an entirety of the story. It should be appreciated that the input 800 may include narration of a story. Even still, the input 800 may include profile information about at least one of the storyteller and the listener. The profile information may comprise topics of interest, demographic data, a history of stories presented, a history of stories listened to, and/or the like. In some embodiments, the storyteller device 900 and/or processing device 904 may assign a character name and image to each of the listeners and/or listening devices 902. In this regard, the storyteller may assign a character to each listener and pictures or face pictures of the listeners may be augmented with the assigned characters and presented to the listeners while narration for providing an immersive experience.

Methods may thereby include identifying, via a processing device 904 communicatively coupled to the storyteller device 900, visual media 802 based on the input 800 (at step 702). In many embodiments, the visual media 802 includes an image, a video, an animation, music, multimedia, and/or the like. It should be appreciated that the visual media 802 may include any type of media to assist and enhance in the storytelling process. Methods may thereby include presenting, via at least one of the storyteller device 900 and a listener device 902 communicatively coupled to the processing device 904, the visual media 802 (at step 704).

Methods may also include identifying, via the storyteller device 900, at least one region within the visual media 802 to present embedded visual media 804 (at step 706). The embedded visual media 804 may include a text, an image, a video, audio data, an interactive animation, and/or multimedia data. Similar to the visual media 802, the embedded visual media 804 may include any type of media to assist and enhance in the storytelling process.

Accordingly, some methods include generating, via the processing device 904, embedded visual media 804 based on one or more selections 806 (at step 708). The generating step 804 may be automatically or manually performed. Even still, methods also include presenting, via at least one of the storyteller device 900 and the listener device 902, the embedded visual media 804 (at step 710). In many embodiments, the embedded visual media 804 is simultaneously presented during narration of the story. The embedded visual media 804 may include any such operation, event or input, such as a touch input, a mouse hovering event, a mouse click event, viewing, zooming, panning, activating a presentation of the embedded visual media, and/or the like.

The embedded visual media 804 may define any format that facilitates capturing of one or more listener interactions 806 with the embedded visual media 804. Accordingly, methods may include recording, via the listener device 902, the one or more listener interactions 806 (at step 712). As illustrated in FIG. 8, the one or more listener interactions 806 are performed using at least one of a mouse, stylus, keyboard, joystick, a haptic interface, a voice based interface, and/or the like.

Methods may thereby include presenting, via the storyteller device 900, an indication of the one or more listener interactions 806 (at step 714). In some embodiments, the methods even include presenting in real-time or near real-time, via the storyteller device 900, responses of the one or more listener interactions 806 to the embedded visual media 804 (at step 716). Any of the presenting steps disclosed herein may be performed via an online platform that communicatively couples the storyteller device 900, the listener device 902, and the processing device 904 together.

The storyteller device 900 may include at least one of a smart phone, a tablet, and a computer, and/or the like. Likewise, the listener device 902 may include at least one of a smart phone, a tablet, a computer, and/or the like. Additionally, the processing device 904 may include at least one of a smart phone, a tablet, a computer, a server, and/or the like.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

The following is claimed:

1. A method of facilitating storytelling using visual media, the method comprising:
   receiving, via a storyteller device associated with a storyteller, an input, wherein the input comprises profile information about the storyteller and at least one listener;
   identifying, via a processing device communicatively coupled to the storyteller device, the visual media based on the input;
   presenting, via at least one of the storyteller device and a listener device communicatively coupled to the processing device, the visual media, wherein the listener device is associated with the at least one listener,
   generating, via the processing device, an embedded visual media based on one or more selections;
   presenting, via the listener device, the embedded visual media;
   facilitating, via the listener device, the at least one listener to perform one or more listener interactions to the embedded visual media;
   capturing, via the listener device, the one or more listener interactions; and
   presenting, via the storyteller device, the one or more listener interactions in a heat-map format, wherein a temperature of the heat-map format is associated with a region of the embedded visual media to thereby indicate a number of interactions from the one or more listener interactions on the region of the embedded visual media.

2. The method of claim 1, wherein the input comprises at least one of a story title, keywords associated with a story, an excerpt of the story, an abstract of the story, and an entirety of the story.

3. The method of claim 1, wherein the profile information comprises at least one of topics of interest, demographic data, geolocation data, a history of stories presented, and a history of stories listened to.

4. The method of claim 1, wherein the visual media comprises at least one of an image, a video, an animation, music, and multimedia.

5. The method of claim 1, further comprising presenting embedded visual media, wherein the embedded visual media comprises at least one of a text, an image, a video, audio data, an interactive animation, and multimedia data.

6. The method of claim 1, wherein the embedded visual media defines a format that facilitates capturing of the one or more listener interactionsith the embedded visual media.

7. The method of claim 1, wherein the one or more listener interactions comprise at least one of a touch input, a mouse hovering event, a mouse click event, viewing, zooming, panning, and activating a presentation of the embedded visual media.

8. The method of claim 1, wherein the one or more listener interactions are performed using at least one of a mouse, stylus, keyboard, joystick, a haptic interface, and a voice based interface.

9. The method of claim 1, further comprising:
   presenting, via the storyteller device, an indication of the one or more listener interactions.

10. The method of claim 1, wherein the one or more listener interactions are presented via the storyteller device in a leaderboard format.

11. The method of claim 1, further comprising presenting in real-time, via the storyteller device, responses of the one or more listener interactions to the embedded visual media.

12. The method of claim 1, wherein the embedded visual media is simultaneously presented during narration of a story.

13. The method of claim 1, wherein the storyteller device comprises at least one of a first smart phone, a first tablet, and a first computer, and wherein the listener device comprises at least one of a second smart phone, a second tablet, and a second computer.

14. The method of claim 1, wherein the presenting step is performed via an online platform that communicatively couples the processing device, the storyteller device, and the listener device together.

* * * * *